United States Patent [19]

Allen

[11] Patent Number: 5,445,125
[45] Date of Patent: Aug. 29, 1995

[54] ELECTRONIC THROTTLE CONTROL INTERFACE

[75] Inventor: Jeffrey James Allen, Grosse Pointe, Mich.

[73] Assignee: General Motors Corporation, Detroit, Mich.

[21] Appl. No.: 213,854

[22] Filed: Mar. 16, 1994

[51] Int. Cl.$^6$ ............................................. F02D 11/10
[52] U.S. Cl. ................................................ 123/399
[58] Field of Search .............. 123/361, 396, 399, 403; 364/431.07

[56] References Cited

U.S. PATENT DOCUMENTS

| | | | |
|---|---|---|---|
| 4,691,676 | 9/1987 | Kikuchi | 123/361 |
| 4,955,346 | 9/1990 | Kaneyasu et al. | 123/361 |
| 5,115,396 | 5/1992 | Keegan | 123/361 |
| 5,200,898 | 4/1993 | Yuhara et al. | 123/361 |
| 5,307,776 | 5/1994 | Unuvar et al. | 123/399 |
| 5,320,076 | 6/1994 | Reppich et al. | 123/399 |
| 5,345,907 | 9/1994 | Matsuoka | 123/399 |
| 5,372,110 | 12/1994 | Boverie et al. | 123/361 |

FOREIGN PATENT DOCUMENTS

| | | | |
|---|---|---|---|
| 91/04400 | 4/1991 | European Pat. Off. | 123/361 |
| 257742 | 10/1989 | Japan | 123/361 |
| 3512473 | 10/1985 | United Kingdom | 123/361 |

*Primary Examiner*—Willis R. Wolfe
*Attorney, Agent, or Firm*—Michael J. Bridges

[57] ABSTRACT

An interface for application in electronic throttle control for automotive vehicles allows for improved scope of accelerator authority including at times when competing control algorithms, such as idle speed, cruise and traction control algorithms are operating, and facilitates a smooth interaction between accelerator-based control commands and competing control algorithm control commands to minimize perception of the interaction.

8 Claims, 3 Drawing Sheets

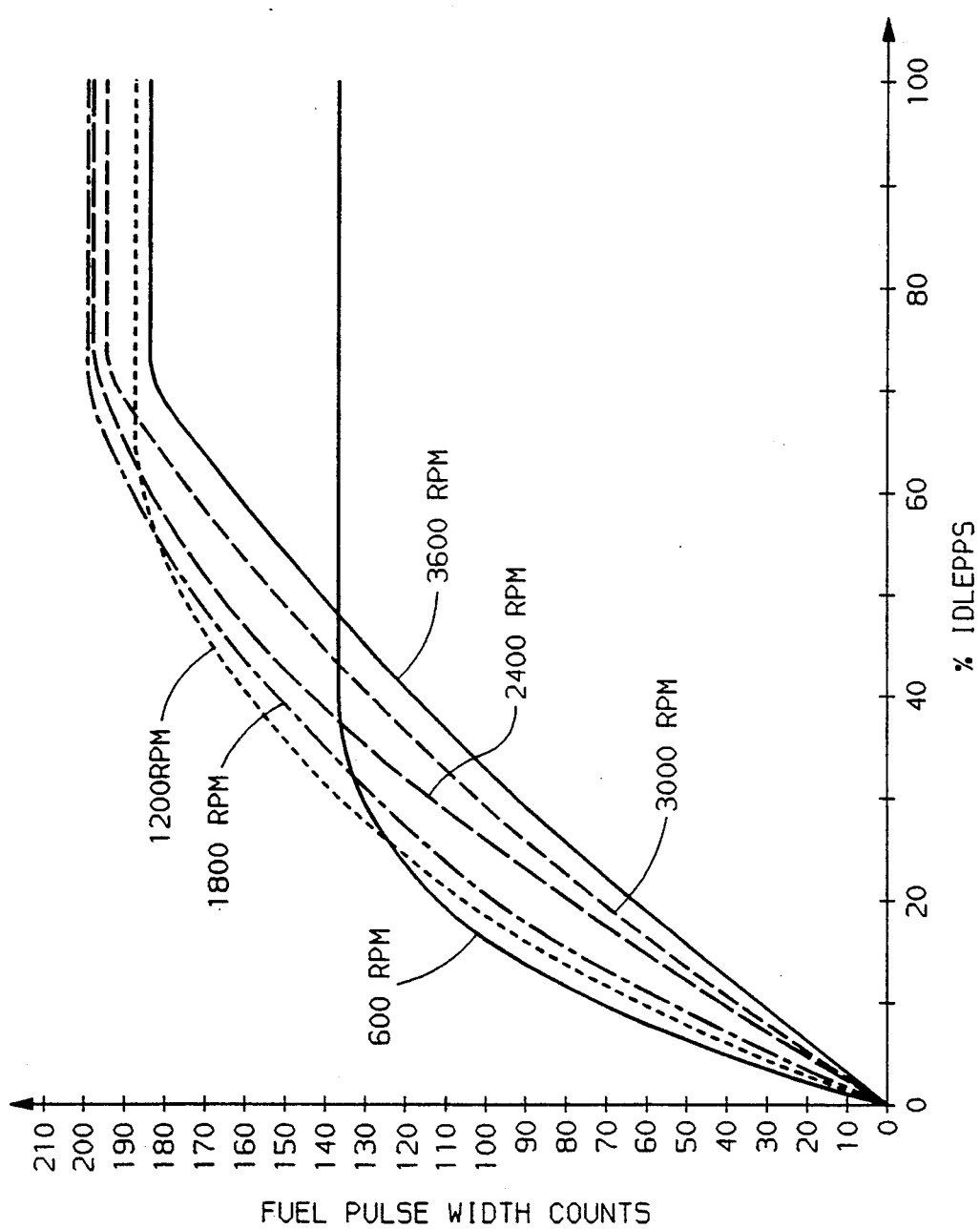

ELECTRONIC THROTTLE CONTROL INTERFACE

FIELD OF THE INVENTION

The following invention relates to automotive vehicle control and, more particularly, to electronic throttle control in automotive vehicles.

BACKGROUND OF THE INVENTION

Electronic throttle control ETC has been applied to automotive vehicles in which an electrical signal indicating an accelerator position, such as an accelerator pedal displacement away from a rest position, is provided to a powertrain controller which generates powertrain control commands in response to the signal. The powertrain control commands include fueling commands to control engine output torque, transmission shift commands, and EGR, turbocharger wastegate, and glow plug commands.

The powertrain control authority of the accelerator may, at times during powertrain operation, be superseded or augmented by specialized control algorithms. For example, when the accelerator is not depressed away from its rest position and the engine is operating, an idle speed control may be given such control authority. Such authority may gradually be reduced as the accelerator is depressed. Alternatively, a cruise control algorithm may be given such authority when activated by the powertrain operator. Still further, authority given a traction control algorithm may supersede that of a depressed accelerator under certain operating conditions. The specialized control algorithms having authority generally command an powertrain operating level to which the powertrain is responsive.

By depressing the accelerator, the powertrain operator may regain any lost powertrain control authority. However, until such time as accelerator command exceeds the powertrain operating level commanded by any specialized algorithm that may have authority, the accelerator will, under known prior art control approaches, appear to the operator to have limited authority or indeed no authority at all, as the accelerator movement will appear to have little or no impact on the powertrain operating level. For example, until the engine output torque commanded by the accelerator position exceeds that of an idle speed control algorithm that may be operating, movement of that accelerator will not produce a proportionate change in engine torque. Such limited authority may not please the powertrain operator, as it may make the powertrain feel less responsive and may make the operator feel less in control of the powertrain.

Accordingly, what is needed is a powertrain control approach that provides for an interface between any specialized powertrain control algorithms that may, at times, have authority over the powertrain, and the accelerator, to allow for a cooperation between the algorithms and the accelerator whereby the specialized algorithms may carry out their specialized tasks without significantly diminishing the apparent authority of the accelerator.

SUMMARY OF THE INVENTION

The following invention addresses the described need by providing an interface between the specialized algorithms and the accelerator whereby an appropriate level of information from the specialized algorithms and from the accelerator are included at all times in a formation of a commanded powertrain operating level.

Specifically, the interface allows any active specialized algorithm the appropriate degree of powertrain control authority in the absence of a depressed accelerator and, when the accelerator is depressed, augments the accelerator command with a value derived from the powertrain control command from the active specialized algorithm to provide a smooth control transition into the control including the depressed accelerator authority. The derived value is periodically updated to provide for a smooth transition back to a control that does not include a depressed accelerator authority.

Through the approach of this invention, powertrain operator perceived authority is preserved while allowing a proper degree of authority for any specialized algorithms that may be included in the powertrain control. Furthermore, smooth transitions into and out of control that includes accelerator authority are provided.

BRIEF DESCRIPTION OF THE DRAWINGS

The invention may be best understood by reference to the preferred embodiment and to the drawings in which:

FIG. 4 describes a referenced relationship between commanded powertrain operating point, commanded fuel, and engine speed for the preferred embodiment.

DESCRIPTION OF THE PREFERRED EMBODIMENT

Figure 1:
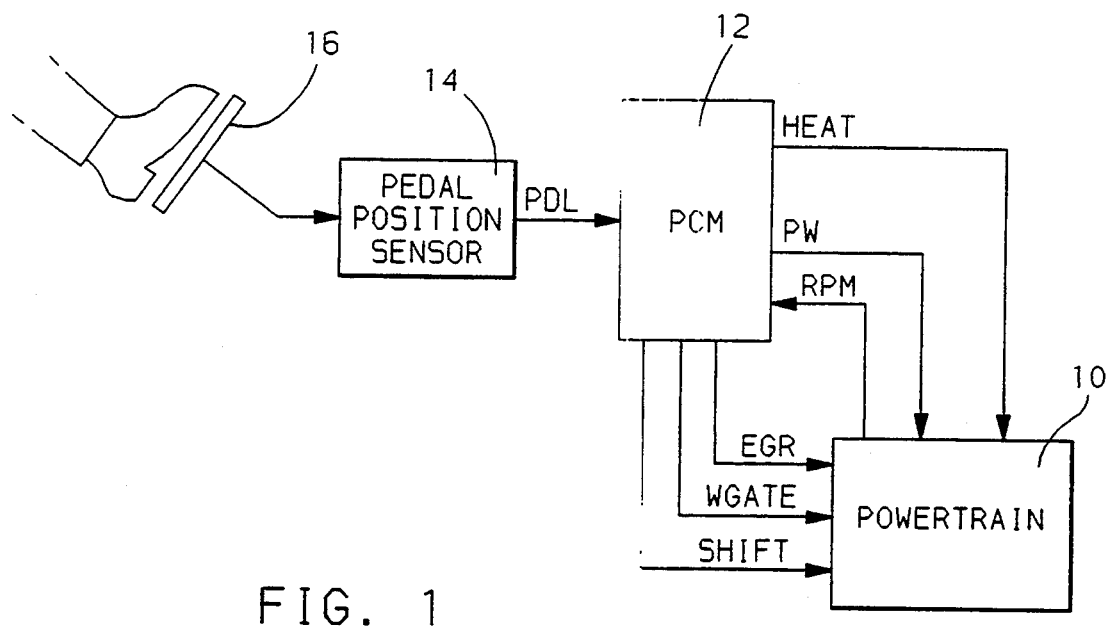
FIG. 1 is a general diagram of the powertrain control hardware used to carry out this invention in accord with the preferred embodiment.

Referring to FIG. 1, a conventional automotive vehicle powertrain 10 is controlled by powertrain control module PCM 12, wherein a series of powertrain parameters generated by conventional powertrain sensors are provided to the PCM 12, including engine speed RPM, and the powertrain control module PCM 12, through execution of a series of predetermined control algorithms stored in the non-volatile memory thereof, issues a series of control signals to the powertrain 10. The series of control signals may include an exhaust gas recirculation command EGR for recirculating a portion of engine exhaust gasses back to the air intake of the engine, a fuel pulse width command PW periodically issued at desired injection times, a glow plug command HEAT for supplemental fuel heating, a shift point command for controlling the state of the transmission of powertrain 10 and, for use with turbo-charged powertrains, a wastegate command for controlling exhaust gas flow through a turbo-charger (not shown).

The PCM 12 may include the conventional controller elements of a conventional microprocessor, nonvolatile and volatile memory, and input/output control units. In addition to the described input information provided to PCM 12, information on a position of accelerator pedal 16, as depressed by force applied by a vehicle operator, such as sensed by conventional potentiometric pedal position sensor 14 is provided by the PCM as signal PDL, representing the displacement of the accelerator pedal 16 away from a rest position.

The PCM 12 executes, in accord with conventional powertrain control practice, a series of powertrain control algorithms to control the powertrain 10 in response to the series of conventional powertrain sensed parameters. Included in the set of routines to control the powertrain is the routine of FIG. 2, which is executed when a vehicle operator applies power to the system including the powertrain control module 12 and the powertrain 10, such as when the operator rotates the vehicle ignition key to its "on" position. The routine of FIG. 2 is entered upon such power-up of the system at a step 50 and proceeds to a step 52 to carry out a conventional initialization process which includes such generally known processes as setting data pointers, counters and storage values to initial values, such as to zero for use in powertrain control routines executed by the PCM 12.

Figure 2:
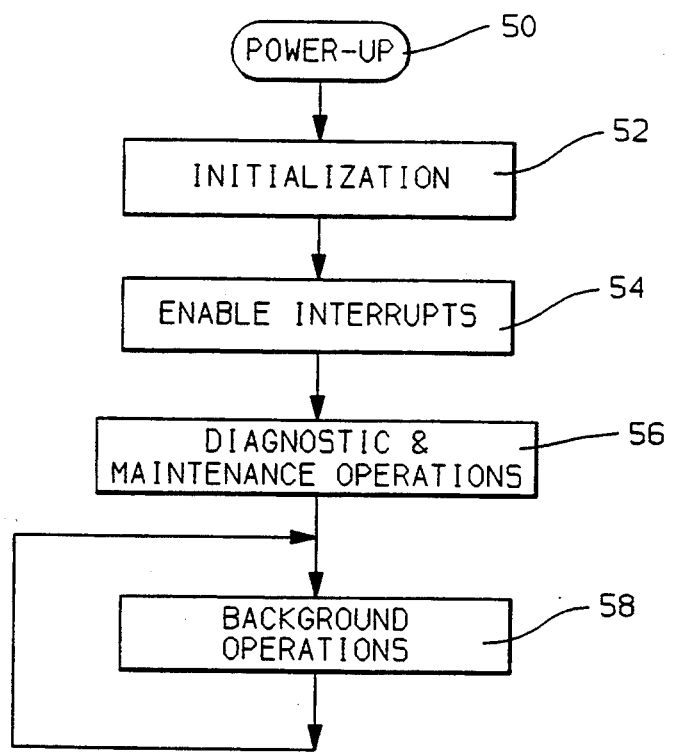
FIGS. 2 and 3 are computer flow diagrams illustrating the steps used to carry out the preferred embodiment of this invention.

After the initialization step 52, the routine of FIG. 2 proceeds to a step 54 to enable interrupts used in the powertrain control of the present embodiment. The enabled interrupts may include event and time-based interrupts as are generally understood in the art. Upon occurrence of any of the enabled interrupts, the system is configured to vector control to predetermined interrupt service routines to properly service the interrupts, and to return control after the interrupts are properly serviced to any prior operations that may have been ongoing at the time of the interrupts. After enabling the interrupts at the step 54, the routine proceeds to a step 56 to carry out any diagnostic and maintenance operations that may be required upon power-up of the system. Such operations may include diagnosis of PCM failures or sensor failures in the system, and maintenance routines to maintain system parameters and hardware in reliable working condition. After the step 56, the routine proceeds to a step 58 to carry out background operations that will be continuously executed while the PCM 12 is operating. The background operations will be interrupted upon occurrence of any of the enabled interrupts so that control may be vectored from the background operations to the appropriate interrupt service routine.

Figure 3:
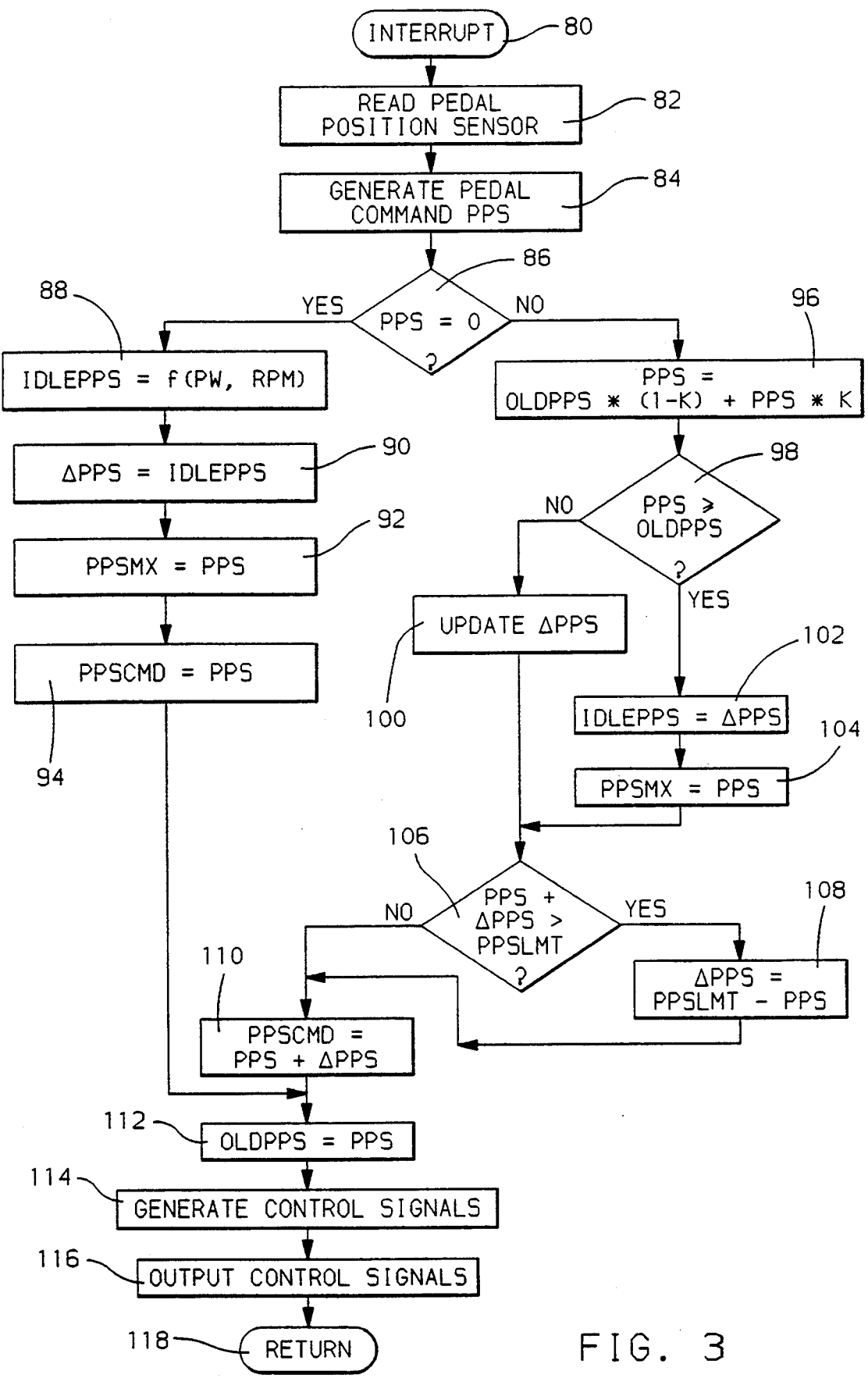

Referring to FIG. 3, the interrupt service routine to service a PCM interrupt that, in this embodiment, is configured to occur approximately every 25 milliseconds while the PCM 12 is operating, is illustrated. Upon occurrence of the 25 millisecond interrupt, the background operations of step 58 of FIG. 2 will be interrupted and the PCM 12 will vector control through the interrupt service routine illustrated in FIG. 3, starting at a step 80. From the step 80, the routine of FIG. 3 proceeds to a step 82 to read a pedal position sensor, such as by reading the output signal PDL of the described sensor 14 (FIG. 1), and then proceeds to a step 84 to generate from that read pedal position sensor a pedal command PPS. The generated pedal command PPS may be a filtered version of the read pedal position sensor information, such as by passing the signal PDL through a conventional lag filter process to reduce the impact of any sensor or signal noise on the precision of the signal in describing the displacement of the pedal 16 (FIG. 1) away from its rest position.

After generating PPS at the step 84, the routine of FIG. 3 proceeds to a step 86 to determine if PPS is approximately zero, indicating the pedal is substantially at its rest position. If PPS is about zero at the step 86, the routine proceeds to a step 88 to reference an idle pedal position value IDLEPPS from controller non-volatile memory, as a function of a fuel pulse width PW and engine speed RPM. IDLEPPS is the accelerator pedal position that, if commanded by the powertrain operator, would result in an powertrain operating point substantially as represented by the present PW and RPM.

For example, FIG. 4 illustrates a family of curves each of which corresponds to an engine speed RPM, as indicated in FIG. 4, and each of which describes the percent IDLEPPS for a fuel pulse width and engine speed, as calibrated for the powertrain 12 and accelerator pedal 16 (FIG. 1) of this embodiment. The relationship between IDLEPPS, the fuel pulse width PW and engine speed RPM may be predetermined through a conventional calibration process, for example by determining, for each of a series of accelerator pedal positions and engine speeds, the corresponding desired fuel pulse width that will yield an engine operating level reflecting a beneficial trade-off between such competing goals as engine performance, emissions, and fuel economy.

After calibrating the relationship between IDLEPPS, fuel pulse width, and engine speed RPM, the IDLEPPS, pulse width and RPM values may be stored as a series of entries in controller non-volatile memory, such as in a conventional lookup table format, wherein a single accelerator pedal position may be referenced from the table by interpolating between engine speed values and fuel pulse width values in the table, as is generally understood in the art.

Returning to FIG. 3, after referencing IDLEPPS at the step 88, the routine proceeds to a step 90 to set a $\Delta$PPS value equal to the IDLEPPS value for use later in the present routine, and then proceeds to a step 92 to reset a maximum pedal position value PPSMX to the current pedal position value PPS. The PPSMX value will be used later in the routine as a maximum sensed pedal position to be updated every 25 milliseconds, if necessary. After resetting PPSMX at the step 92, the routine proceeds to a step 94 to update the pedal command PPSCMD by setting it to PPS. PPSCMD is used, in this embodiment, as the commanded powertrain operating level, and is referenced by any included conventional powertrain control routines that rely on accelerator pedal position or its equivalent in the generation of control commands. For example, PPSCMD may be used in routines to generate wastegate, shiftpoint, fuel pulse width and timing, and supplemental fuel heating commands, as was described in FIG. 1. Such use of a pedal command is generally recognized in the art of powertrain control. After setting the PPS command to the current sensed pedal position value PPS at the step 94, the routine proceeds to a step 112, to be described.

Returning to the step 86, if PPS if not substantially zero, indicating that the powertrain operator has depressed the accelerator pedal substantially away from its rest position, the routine proceeds to a step 96 to provide further filtering, beyond that of the described step 84, to the PPS value. Such filtering may be carried out by passing PPS through a conventional lag filter in which an old value of PPS, stored as OLDPPS, and the current PPS value are each weighted according to a predetermined weighting function and are combined to provide a slower, steadier, more stable PPS signal.

For example, at the step 96 PPS and OLDPPS may be passed through the following conventional lag filter process $$PPS = OLDPPS * (1-K) + PPS * K$$

in which the filter coefficient K is less than one, such as 0.5 in this embodiment. After passing PPS through the additional filtering provided at the step 96, the routine proceeds to a step 98 to compare PPS to OLDPPS, which is the PPS value from the most recent prior iteration of the service routine of FIG. 3 (and which is initialized to zero at power-up, such as at the described step 52 of the routine of FIG. 2).

If PPS exceeds or is equal to the OLDPPS value at the step 98, the accelerator is not decreasing such that, in this embodiment, steps 102 and 104 are executed. Specifically, at the step 102, the IDLEPPS value is "frozen" or held constant, by setting it to the ΔPPS value. IDLEPPS will be used in updating ΔPPS when the PPS value is determined at the step 98 to be decreasing, as will be described. After the step 102, the step 104 is executed to reset the PPSMX value to PPS, for use as a starting point for updating the ΔPPS value, as will be described. Alternatively, if PPS is less than OLDPPS at the step 98, the routine proceeds to a step 100 to update ΔPPS as follows $$\Delta PPS = (PPS/PPSMX) * IDLEPPS.$$

In this manner, ΔPPS is reduced whenever the pedal command is decreasing, wherein the amount of the decrease is in linear proportion to the most recent maximum pedal position PPSMX, and is defined so ΔPPS is at zero when the accelerator pedal is released.

Through this linear decrease in ΔPPS, the engine will not be fueled at a rate greater than the required idle fuel when the pedal is returned to zero. In other words, no residual ΔPPS value will remain and be added into the determination of the fuel pulse width command when the pedal returns to zero. Additionally, the transition to zero ΔPPS will be smooth via the described linear functional relationship. Furthermore, the present definition of ΔPPS, which will be added to PPS to form PPSCMD, closely correlates the acceleration and deceleration performance of the accelerator pedal 16 (FIG. 1).

Accordingly, at the step 100 which is executed when PPS is decreasing, which is when PPS is less than OLDPPS, ΔPPS will be decreased in proportion to the ratio of the PPS to PPSMX, the starting point of the linear decrease, so that as PPS decreases from the maximum PPSMX toward zero PPS, ΔPPS will likewise be decreased smoothly toward zero, so that when PPS has been returned to zero the PPSCMD value will not exceed the idle fuel that will be required when the pedal is released.

After the step 100 or the step 104, the routine of FIG. 3 proceeds to a step 106 to determine if the overall PPS command including PPS and ΔPPS exceeds a predetermined calibration limit PPSLMT which is set to the value corresponding to a fully depressed accelerator pedal in this embodiment. If the overall PPS command exceeds the limit, indicating that the physical limits of the system of this embodiment may have been exceeded, the routine proceeds to limit ΔPPS at the step 108 by setting it to the maximum value that it can be without violating the limit PPSLMT, which is PPSLMT less the value PPS. Next, or if the overall PPS command does not exceed the limit at the step 106, the routine proceeds to a step 110 to generate the overall PPS command used for powertrain control as described at the step 94, as the sum of PPS and ΔPPS.

After generating PPSCMD at the step 110 or the step 94, the routine proceeds to a step 112 to store the present PPS pedal command as OLDPPS, for use in the next iteration of this routine, and then proceeds to a step 114 to generate control signals that may be required to be executed in the 25 millisecond interrupt of FIG. 3, such as any powertrain control or diagnostic signals that may be required to be generated during the servicing of this time-based interrupt. The control signals may be dependent on the generated PPSCMD value, which is also the value that the powertrain controller will rely on as representing a commanded powertrain operating point, including information on an operator command and information from other specialized control algorithms that may be operating.

Accordingly, the modifications to the PPS command value as provided through the routines of this embodiment will be substantially invisible to the powertrain controller as all changes or adjustments to PPSCMD will be carried out before that command is applied in powertrain control. After generating any conventional control signals that may require accelerator pedal position command value PPSCMD at the step 114, the routine proceeds to a step 116 to output the control signals to the various conventional actuators associated with the powertrain control of this embodiment, and then proceeds to a step 118 to return to any prior operations that were ongoing at the time of the 25 millisecond time-based interrupt that invoked the routine of FIG. 3. As described, the routine of FIG. 3 will be repeated in the manner described for each of a series of subsequent 25 millisecond time-based powertrain controller interrupts.

Through the described steps of the present embodiment of this invention, the accelerator pedal of the vehicle or other equivalent accelerator means will have appropriate powertrain response for any displacement whereof, including displacement thereof below any set point provided by idle speed control. The inventors envision that the principles of this invention in an alternative embodiment may be applied along with an active conventional cruise control system or algorithm or a conventional traction control system or algorithm, or indeed any system or algorithm which operates with electronic throttle control to adjust the powertrain operating level away from that indicated by the position of the accelerator, wherein an interface between such specialized control algorithms and the operator's input through the accelerator pedal may be required. The approach of this invention provides for smooth transitions between any such competing control inputs, while preserving the perceived authority of the accelerator and the necessary authority of any specialized control algorithms or systems that may be operating.

For example, if the vehicle operator, while conventional cruise control is active, depresses the accelerator pedal or equivalent accelerator means away from a rest position, the ΔPPS command may be set in proportion to that displacement and decayed away toward zero in the manner described in FIG. 3 while the pedal position is reduced toward zero, such that when the pedal position returns to zero the vehicle is operating substantially at the desired cruise control set point. Additionally, in the case of conventional traction control applied along with the principles of this invention, if the accelerator pedal or equivalent accelerator means is depressed away from the rest position while traction control is active, the pedal will be given a representative degree of authority that may be decayed away from zero while the pedal is reduced toward zero from its displaced position, through the process illustrated in the described FIG. 3.

The preferred embodiment for the purpose of explaining this invention is not to be taken as limiting or restricting this invention since many modifications may be made through the exercise of skill in the art without departing from the scope of this invention.

The embodiments of the invention in which a property or privilege is claimed are described as follows:

1. A method for controlling operation of an automotive internal combustion engine having electronic throttle control, comprising the steps of:
sensing an operator requested engine operating level;
generating a first desired engine operating level when the sensed operator requested engine operating level is substantially zero;
controlling engine operation in accord with the generated first desired engine operating level, when the sensed operator requested engine operating level is substantially zero;
generating a second desired engine operating level when the sensed operator requested engine operating level is not substantially zero, by (a) setting an offset value to a predetermined function of the generated first desired engine operating level, (b) determining when the operator requested engine operating level is decreasing, (b) decreasing the offset value in accord with a predetermined decrease function when the operator requested engine operating level is decreasing, and (c) combining the offset value with the sensed operator requested engine operating level to generate the second desired engine operating level; and
controlling engine operation in accord with the generated second desired engine operating level when sensed operator requested engine operating level is not substantially zero.

2. The method of claim 1, wherein the predetermined decrease function is a linear function that decreases the offset value in such a manner that the offset value will be substantially zero when the operator requested engine operating level decreases substantially to zero.

3. The method of claim 1, further comprising the steps of:
comparing the generated second desired engine operating level to a predetermined limit value; and
reducing the generated second desired engine operating level so as to not exceed the predetermined limit value when the generated second desired engine operating level exceeds the predetermined limit value.

4. The method of claim 3, wherein the reducing step reduces the generated second desired engine operating level by reducing the offset value to a difference between the predetermined limit value and the operator requested engine operating level and then by regenerating the second desired engine operating level as a combination of the offset value and the operator requested engine operating level.

5. An engine control method for an automotive vehicle having electronic throttle control, comprising the steps of:
sensing a degree of displacement of an accelerator pedal away from a rest position indicating a commanded engine operating point;
sensing when the degree of displacement is substantially zero;
determining a desired zero pedal engine operating level when the degree of displacement is substantially zero;
controlling the engine in accord with the determined desired zero pedal engine operating level when the degree of displacement is substantially zero;
determining a desired non-zero pedal engine operating level when the degree of displacement is not substantially zero, by (a) storing the desired zero pedal engine operating level as a delta pedal value, (b) determining when the degree of displacement is decreasing, (c) decaying the delta pedal value at a predetermined rate of decay toward zero when the degree of displacement is decreasing, (d) determining the desired non-zero pedal engine operating level as a predetermined function of the decay value and the sensed degree of displacement; and
controlling the engine in accord with the determined desired non-zero pedal engine operating level when the degree of displacement is not substantially zero.

6. The method of claim 5, wherein the step of determining when the pedal displacement is decreasing comprises the steps of:
sensing a prior degree of displacement of the accelerator pedal away from the rest position;
comparing the sensed prior degree of displacement to the sensed degree of displacement;
determining that the degree of displacement is decreasing when the sensed degree of displacement is less than the sensed prior degree of displacement.

7. The method of claim 5, wherein the sep of determining a desired non-zero pedal engine operating level further comprises the step of:
storing the degree of displacement as a maximum degree of displacement when the degree of displacement is not decreasing,
and wherein the predetermined rate of decay is determined as a predetermined function of the stored maximum degree of displacement and of the sensed degree of displacement.

8. The method of claim 7, wherein the predetermined rate of decay is directly proportional to the sensed degree of displacement and is inversely proportional to the stored maximum degree of displacement to provide a smooth decrease in the magnitude of the delta pedal value toward a zero delta pedal value.

* * * * *